United States Patent
Xue et al.

(10) Patent No.: US 11,751,242 B2
(45) Date of Patent: Sep. 5, 2023

(54) RADIO-UNLICENSED MULTI-CHANNEL ACCESS FOR LOW-RADIO FREQUENCY-CAPABLE USER EQUIPMENT

(71) Applicant: QUALCOMM Incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Jing Sun, San Diego, CA (US); Yongbin Wei, La Jolla, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 16/559,252

(22) Filed: Sep. 3, 2019

(65) Prior Publication Data
US 2020/0107364 A1    Apr. 2, 2020

Related U.S. Application Data

(60) Provisional application No. 62/737,552, filed on Sep. 27, 2018.

(51) Int. Cl.
*H04W 74/08*    (2009.01)
*H04W 16/14*    (2009.01)
(Continued)

(52) U.S. Cl.
CPC ....... *H04W 74/0808* (2013.01); *H04W 16/14* (2013.01); *H04W 24/08* (2013.01); *H04W 72/23* (2023.01)

(58) Field of Classification Search
CPC ..... H04W 16/14; H04W 24/02; H04W 24/08; H04W 72/042; H04W 74/006; H04W 74/0808; H04W 74/0816
See application file for complete search history.

(56) References Cited

U.S. PATENT DOCUMENTS

| 2008/0137627 A1* | 6/2008 | Fischer | H04W 16/14 |
| | | | 370/338 |
| 2013/0188506 A1* | 7/2013 | Cheong | H04W 72/04 |
| | | | 370/252 |

(Continued)

FOREIGN PATENT DOCUMENTS

WO    WO-2018058597 A1    4/2018

OTHER PUBLICATIONS

Huawei et al., "Coexistence and Channel Access for NR Unlicensed Band Operations", 3GPP TSG-RAN WG1 #92, 3GPP Draft; R1-1801371, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 17, 2018 (Feb. 17, 2018), 7 Pages, XP051397535, Retrieved from the Internet: URL: http://www.3gpp.org/ftp/tsg_ran/WG1_RL1/TSGR1_92/Docs/ [retrieved on Feb. 17, 2018], Figures 1-3, Sections 1-4.

(Continued)

*Primary Examiner* — Jason E Mattis
*Assistant Examiner* — Bao G Nguyen
(74) *Attorney, Agent, or Firm* — Norton Rose Fulbright US LLP

(57) ABSTRACT

New radio (NR) unlicensed (NR-U) multi-channel access is disclosed for low-radio frequency (RF)-capable user equipment (UE). A base station may enable multi-channel access when single operator operations cannot be guaranteed within a shared communication spectrum. The primary and secondary channels are defined within the shared communication channel. The base station may then transmit a configuration message to one or more low-RF UEs that identifies the channels and directs the UEs to monitor the primary channel for a successful listen before talk (LBT) indicator. The base station performs an LBT procedure on the primary channel (Continued)

and the secondary channel and signals the low-RF UEs to re-tune to the secondary channel for communication during a current transmission opportunity.

19 Claims, 9 Drawing Sheets

(51) Int. Cl.
*H04W 24/08* (2009.01)
*H04W 72/23* (2023.01)

(56) References Cited

U.S. PATENT DOCUMENTS

| | | | | |
|---|---|---|---|---|
| 2014/0307639 | A1* | 10/2014 | Jung | H04W 72/042 370/329 |
| 2015/0296516 | A1* | 10/2015 | Jung | H04W 16/14 370/312 |
| 2015/0373741 | A1* | 12/2015 | Yerramalli | H04W 24/08 370/336 |
| 2016/0105836 | A1* | 4/2016 | Seok | H04B 7/0452 370/331 |
| 2017/0257890 | A1* | 9/2017 | Biswas | H04W 74/006 |
| 2018/0255576 | A1* | 9/2018 | Bhorkar | H04L 5/001 |
| 2018/0279274 | A1* | 9/2018 | Sun | H04L 1/1864 |
| 2020/0067577 | A1* | 2/2020 | Lou | H04L 27/2601 |

OTHER PUBLICATIONS

International Search Report and Written Opinion—PCT/US2019/049809—ISA/EPO—dated Nov. 19, 2019.

* cited by examiner

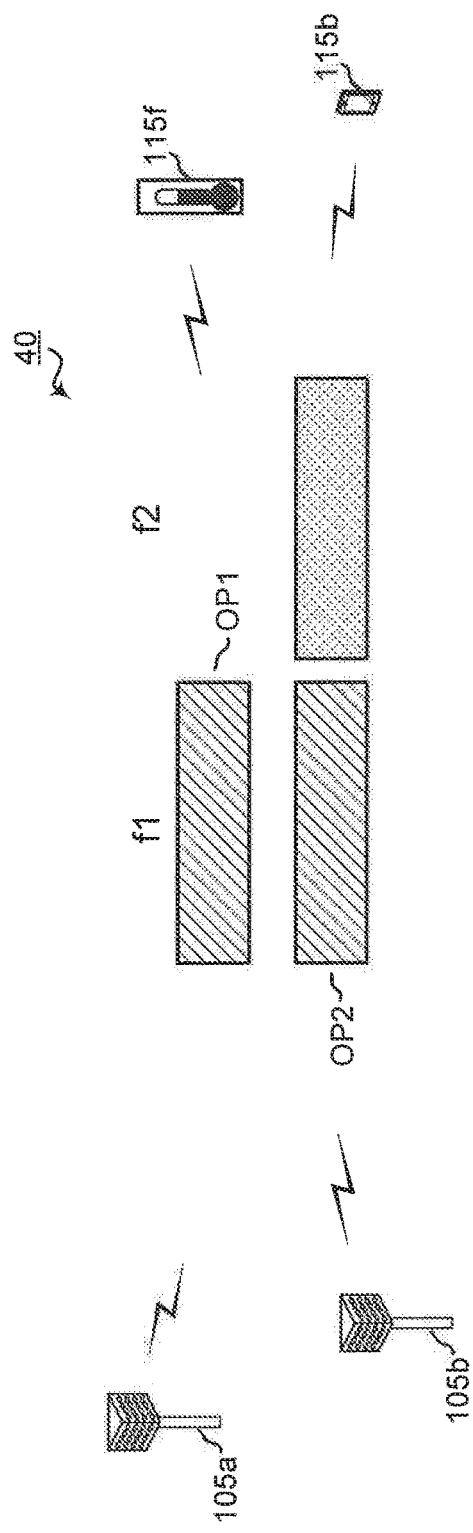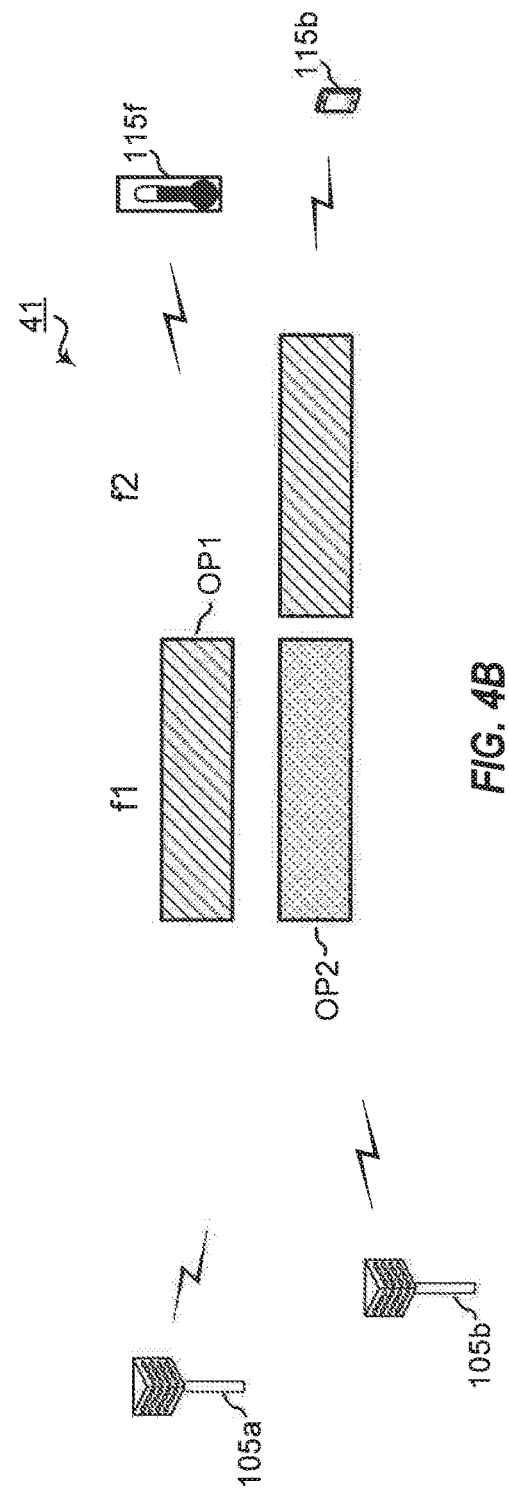

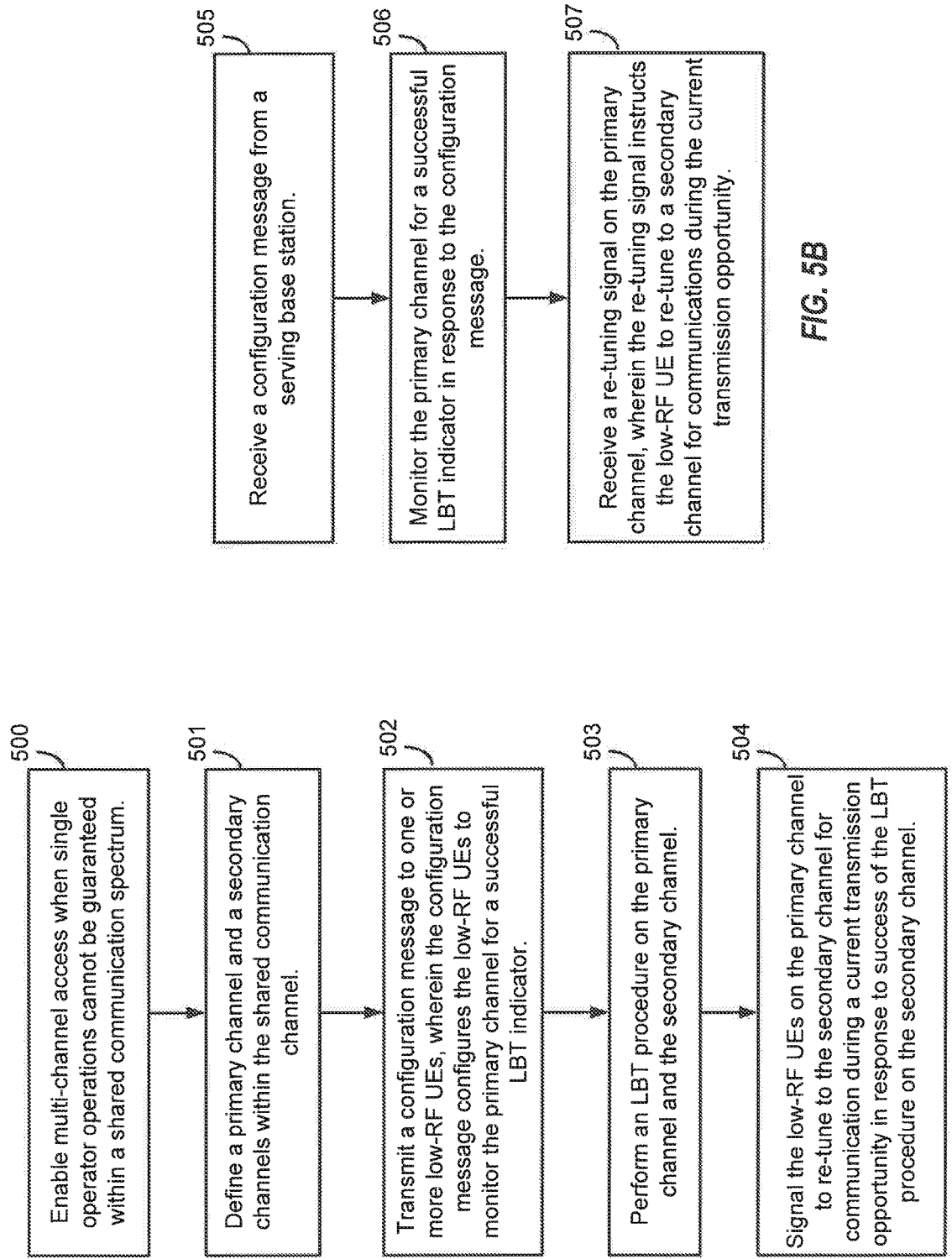

RADIO-UNLICENSED MULTI-CHANNEL ACCESS FOR LOW-RADIO FREQUENCY-CAPABLE USER EQUIPMENT

CROSS-REFERENCE TO RELATED APPLICATIONS

This application claims the benefit of U.S. Provisional Patent Application No. 62/737,552, entitled, "NR-U MULTI-CHANNEL ACCESS FOR LOW-RF-CAPABLE UES," filed on Sep. 27, 2018, which is expressly incorporated by reference herein in its entirety.

BACKGROUND

Field

Aspects of the present disclosure relate generally to wireless communication systems, and more particularly, to new radio (NR) unlicensed (NR-U) multi-channel access for low-radio frequency (RF)-capable user equipment (UE).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RE) transmitters. On the uplink, a transmission from the UE may encounter interference from uplink transmissions of other UEs communicating with the neighbor base stations or from other wireless RE transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes enabling, by a base station, multi-channel access when single operator operations cannot be guaranteed within a shared communication spectrum, defining, by the base station, a primary channel and a secondary channels within the shared communication channel, transmitting, by the base station, a configuration message to one or more low-radio frequency (RF) user equipments (UEs), wherein the configuration message configures the one or more low-RF UEs to monitor the primary channel for a successful listen before talk (LBT) indicator, performing, by the base station, an LBT procedure on the primary channel and the secondary channel, and signaling, by the base station, the one or more low-RF UEs on the primary channel to re-tune to the secondary channel for communication during a current transmission opportunity in response to success of the LBT procedure on the secondary channel.

In an additional aspect of the disclosure, a method of communication includes receiving, by a low-RF UE, a configuration message from a serving base station, monitoring, by the low-RE UE, the primary channel for a successful LBT indicator in response to the configuration message, and receiving, by the low-RF UE, a re-tuning signal on the primary channel, wherein the re-tuning signal instructs the low-RF UE to re-tune to a secondary channel for communications during the current transmission opportunity.

In an additional aspect of the disclosure, an apparatus configured for wireless communication includes means for enabling, by a base station, multi-channel access when single operator operations cannot be guaranteed within a shared communication spectrum, means for defining, by the base station, a primary channel and a secondary channels within the shared communication channel, means for transmitting, by the base station, a configuration message to one or more low-RF UEs, wherein the configuration message configures the one or more low-RF UEs to monitor the primary channel for a successful LBT indicator, means for performing, by the base station, an LBT procedure on the primary channel and the secondary channel, and means for signaling, by the base station, the one or more low-RF UEs on the primary channel to re-tune to the secondary channel for communication during a current transmission opportunity in response to success of the LBT procedure on the secondary channel.

In an additional aspect of the disclosure, an apparatus configured for wireless communication includes means for receiving, by a low-RF UE, a configuration message from a serving base station, means for monitoring, by the low-RF UE, the primary channel for a successful LBT indicator in response to the configuration message, and means for receiving, by the low-RF UE, a re-tuning signal on the primary channel, wherein the re-tuning signal instructs the low-RF UE to re-tune to a secondary channel for communications during the current transmission opportunity.

In an additional aspect of the disclosure, a non-transitory computer-readable medium having program code recorded thereon. The program code further includes code to enable, by a base station, multi-channel access when single operator operations cannot be guaranteed within a shared communication spectrum, code to define, by the base station, a primary channel and a secondary channels within the shared communication channel, code to transmit, by the base station, a configuration message to one or more low-RF UEs, wherein the configuration message configures the one or more low-RF UEs to monitor the primary channel for a successful LBT indicator, code to perform, by the base station, an LBT procedure on the primary channel and the secondary channel, and code to signal, by the base station, the one or more low-RF UEs on the primary channel to re-tune to the secondary channel for communication during a current transmission opportunity in response to success of the LBT procedure on the secondary channel.

In an additional aspect of the disclosure, a non-transitory computer-readable medium having program code recorded thereon. The program code further includes code to receive, by a low-RF UE, a configuration message from a serving base station, code to monitor, by the low-RF UE, the primary channel for a successful LBT indicator in response to the configuration message, and code to receive, by the low-RF UE, a re-tuning signal on the primary channel, wherein the re-tuning signal instructs the low-RF UE to re-tune to a secondary channel for communications during the current transmission opportunity.

In an additional aspect of the disclosure, an apparatus configured for wireless communication is disclosed. The apparatus includes at least one processor, and a memory coupled to the processor. The processor is configured to enable, by a base station, multi-channel access when single operator operations cannot be guaranteed within a shared communication spectrum, to define, by the base station, a primary channel and a secondary channels within the shared communication channel, to transmit, by the base station, a configuration message to one or more low-RF UEs, wherein the configuration message configures the one or more low-RF UEs to monitor the primary channel for a successful LBT indicator, to perform, by the base station, an LBT procedure on the primary channel and the secondary channel, and to signal, by the base station, the one or more low-RF UEs on the primary channel to re-tune to the secondary channel for communication during a current transmission opportunity in response to success of the LBT procedure on the secondary channel.

In an additional aspect of the disclosure, an apparatus configured for wireless communication is disclosed. The apparatus includes at least one processor, and a memory coupled to the processor. The processor is configured to receive, by a low-RF UE, a configuration message from a serving base station, to monitor, by the low-RF UE, the primary channel for a successful LBT indicator in response to the configuration message, and to receive, by the low-RF UE, a re-tuning signal on the primary channel, wherein the re-tuning signal instructs the low-RF UE to re-tune to a secondary channel for communications during the current transmission opportunity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B are block diagrams illustrating NR-U networks.

FIGS. 5A and 5B are block diagrams illustrating example blocks executed to implement aspects of the present disclosure.

DETAILED DESCRIPTION

Figure 1:
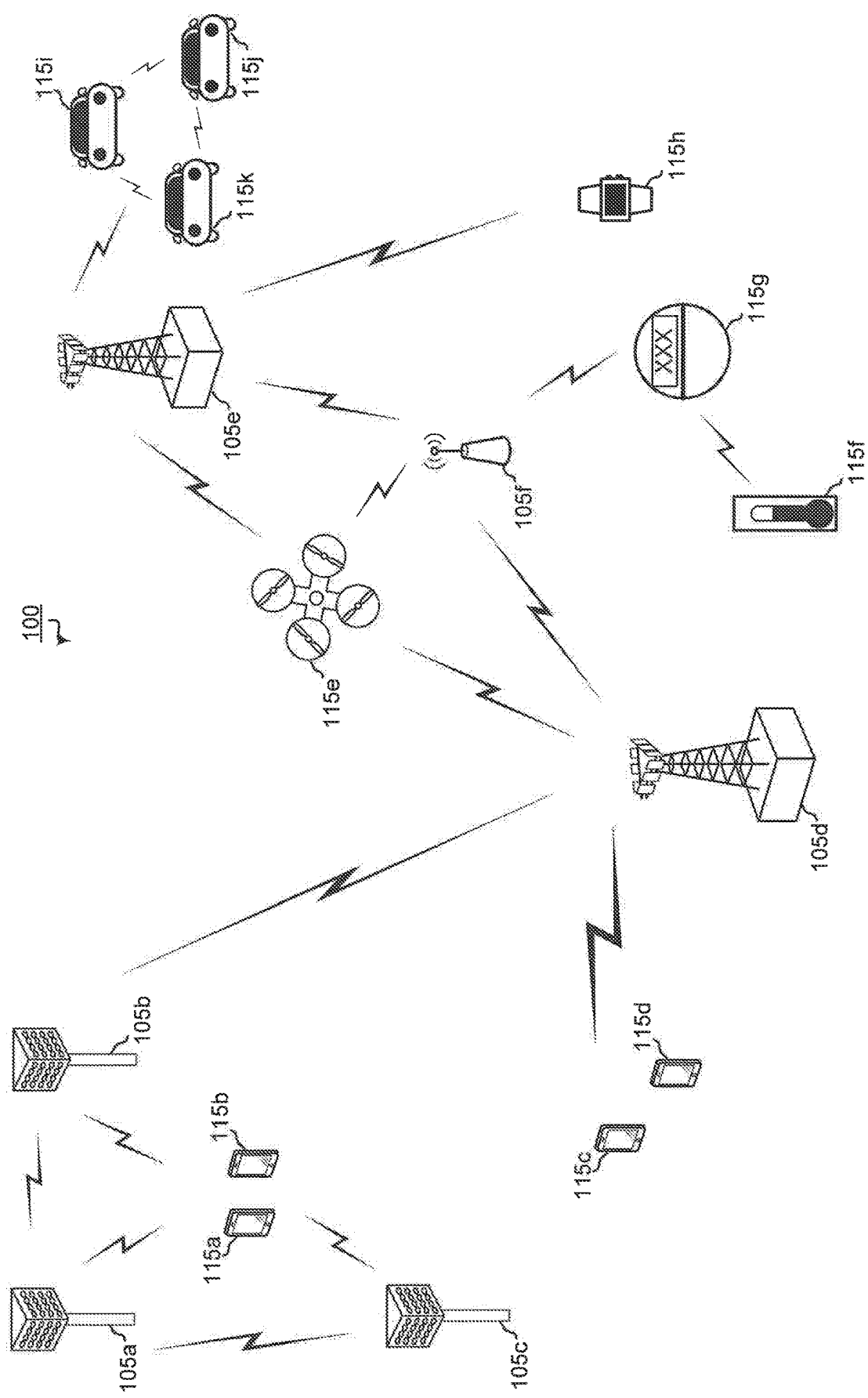
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation. Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively, large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
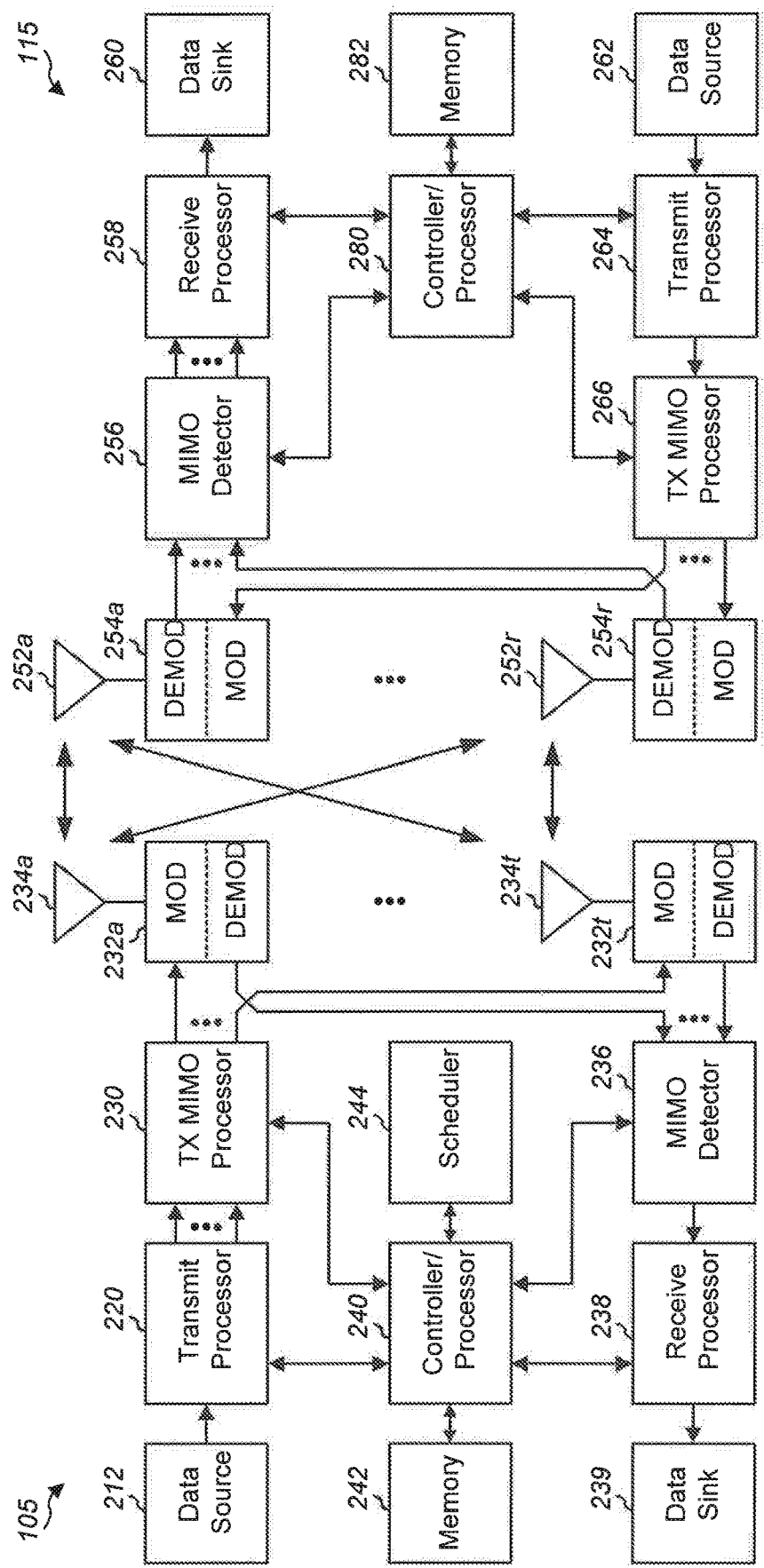
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., preceding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A and 5B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
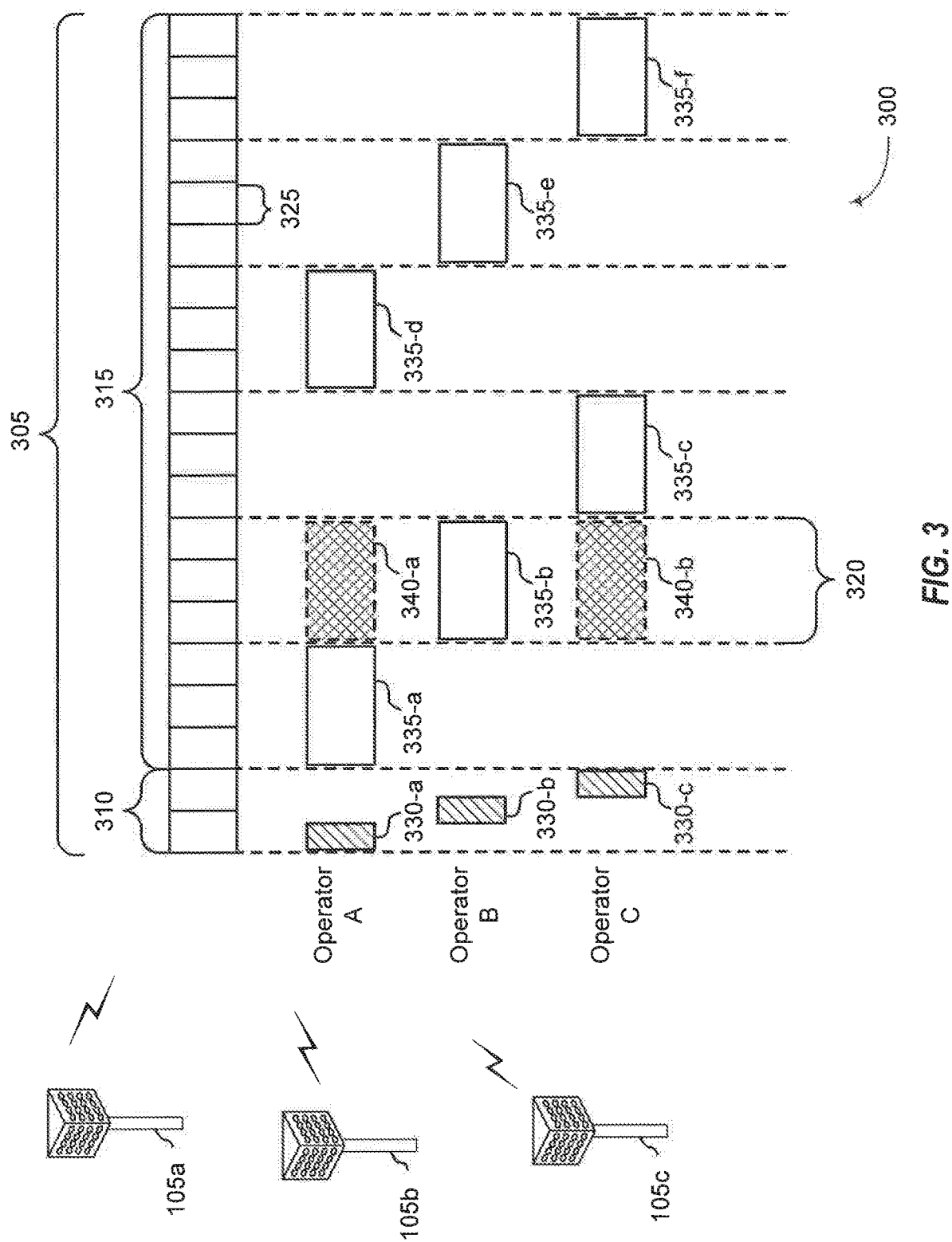
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* (e.g., G-TNT-OpC) may be prioritized for Operator C, resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In sub-7 GHz NR networks, the channel bandwidth can be up to 100 MHz. This channel bandwidth feature for NR networks may be extended to NR unlicensed (NR-U) networks as well. On the other side of the spectrum, the features of 5G NR/NR-U networks have been developed to also accommodate communications of low-RF-capable UEs, such as a device limited to 20 MHz RF coverage. The concept of bandwidth part (BWP) was included for NR/NR-U operations to facilitate support to these low-RF-capable UEs. However, considering the wide range of bandwidths available, listen before talk (LBT) operations in NR-U may impose challenges for detecting truly available shared spectrum. In order to co-exist with WiFi and license assisted access (LAA) networks, NR-U nodes conduct LBT procedures using a 20 MHz granularity (e.g., at an LBT subband). The dynamic/chaotic unlicensed deployment of NR-U operations generally leads to the node checking availability of various an unpredictable numbers of such LBT subbands for each TxOP. Moreover, the particular LBT subband to be monitored is, in general, unpredictable without a specific arrangement of the LBT structure in a multi-channel access environment. Low-RF-capable UEs monitoring a specific subband may lose access opportunities in the current transmission opportunity (TxOP)), which can become a significant issue when a base station or an operator is serving only low-RF-capable UEs. One extreme solution has been suggested to simply disable multi-channel access for this particular base station or operator. Unfortunately this may cause an unfairness in access to the shared spectrum.

FIG. 4A is a block diagram illustrating NR-U network 40. NR-U network 40 provides access to a communication spectrum that may be shared by various radio access technologies on an unlicensed basis. Within access competition between both low-RF-capable and higher-RF-capable devices of two different operators (OP 1 and OP 2), such as low-RF-capable UE 115*f* and UE 115*b*, the LBT configuration of each communication pair (e.g., base station 105*a* and low-RE-capable UE 115*f* of OP 1, base station 105*b* and UE 115*b* of OP 2) may impact the rate of successful access for each node. For example, as illustrated in FIG. 4A, the LBT configuration of OP 1 provides for its only channel, f1, as the primary channel, while the LBT configuration of OP 2 provides the primary channel as f1 and the secondary channel as f2. Thus, each of OP 1 and OP2 have the same channel frequency for their respective primary channels. Such a co-primary configuration generally results in lower performance for communications between base station 105*a* and low-RF-capable UE 115*f* of OP1 than between base station 105*b* and 115*b* of OP 2.

FIG. 4B is a block diagram illustrating NR-U network 41. As illustrated, the LBT configuration of OP 1 provides for f1 as the primary channel, while the LBT configuration of OP 2 provides the primary channel of f2 and secondary channel of f1. As such, the primary channels between OP 1 and OP 2 are interleaved, which gives communications between base station 105*a* and 115*f* of OP 1 a higher probability of success, while still providing communication opportunities for base station 105*b* and UE 115*b* of OP 2. OP 1 may strongly favor no sharing of spectrum with OP 2 at all, unless a fairness restriction exists to ensure OP 1 accessibility. Thus, OP 1 may favor disabling such multi-channel access when multiple operators compete for the same communication spectrum.

Various aspects of the present disclosure are directed to enabling or maintaining multi-channel access when single operator operations cannot be guaranteed. The long-term presence of another operator can detected through the reading of WiFi beacons and LAA or NR-U nodes' discovery reference signals (DRS). Furthermore, the short-term presence of WiFi nodes around LAA and NR-U nodes can also be detected through short training field (STF) correlation as found in WiFi preamble signals. The NR-U networks defines the primary and secondary channels, signals low-RF-capable UEs to monitor the primary for LBT clear signals, and then directs the low-RF-capable UEs to re-tune to the secondary channel for communications after the secondary channel is secured by the NR-U base station.

Figure 7:
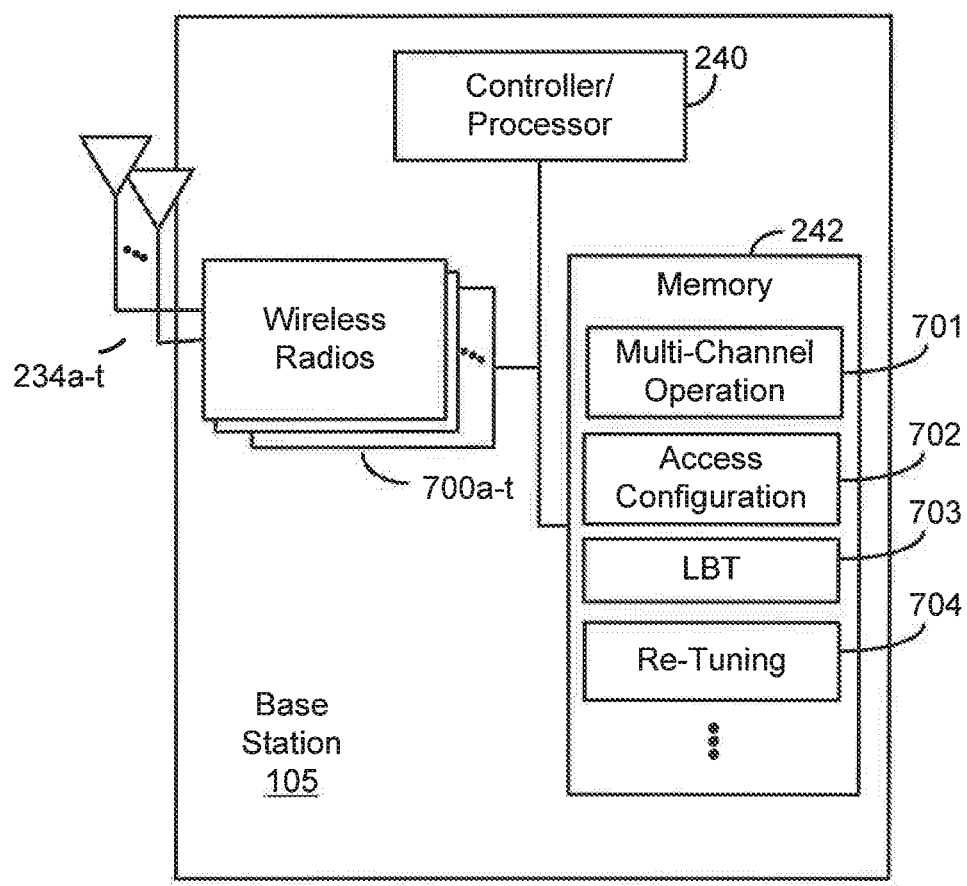
FIG. 7 is a block diagram illustrating an example base station configured according to one aspect of the present disclosure.

FIG. 5A is a block diagram illustrating example blocks executed by a base station to implement one aspect of the present disclosure. The example blocks will also be described with respect to base station 105 as illustrated in FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

At block 500, a base station enables multi-channel access when single operator operations cannot be guaranteed within a shared communication spectrum. Base station, such as base station 105, of a given operator may detect either the long-term or short-term presence of other operators within its coverage area of the shared communication spectrum. For example, various interference signals may be received at base station 105 via antennas 234a-t and wireless radios 700a-t which, under control of controller/processor 240, are determined to originate from interfering transmitters associated with other operators. As such other operators are detected, base station 105 executes multi-channel operations feature 701, in memory 242. The execution environment of multi-channel operations feature 701 ensures that multi-channel access is enabled or maintained for its served UEs.

At block 501, the base station defines a primary channel and a secondary channels within the shared communication channel. For example, base station 105, under control of controller/processor 240, executes access configuration logic 702, stored in memory 242. The execution environment of access configuration logic 702 provides for base station 105 to select an LBT configuration for the TxOP that identities the primary and secondary channels in the shared spectrum.

At block 502, the base station transmits a configuration message to one or more low-RF UEs, wherein the configuration message configures the one or more low-RF UEs to monitor the primary channel for a successful LBT indicator. Within the execution environment of access configuration logic 702, base station 105 transmits a configuration message via wireless radios 700a-t and antennas 234a-t to each of its served low-RF-capable UEs. The configuration message identifies the primary and secondary LBT channels and directs the UEs to monitor the primary channel for results of an LBT procedure (e.g., extended clear channel assessment (ECCA), clear channel assessment (CCA), and the like).

At block 503, the base station performs an LBT procedure on the primary channel and the secondary channel. Base station 105, under control of controller processor 240, executes LBT procedures 703, stored in memory 242. The execution environment of LBT procedures 703 provides the functionally for base station 105 to perform an LBT procedure. For example, the execution environment of LBT procedure 703 allows base station 105 to perform an ECCA on the primary channel and a CCA on the secondary channel prior to initiating further communications. As is known in the art, such LBT procedures may be based on energy detection, preamble detection, or the like.

At block 504, the base station signals the low-RF UEs on the primary channel to re-tune to the secondary channel for communication during a current transmission opportunity in response to success of the LBT procedure on the secondary channel. If the LBT procedures are successful on both the primary and secondary channels, base station 105, under control of controller/processor 240, executes re-tuning logic 704, stored in memory 242. The execution environment of re-tuning logic 704 provides the functionality to base station 105 to transmit signals to the low-RF UEs via wireless radios 700a-t and antennas 234a-t to re-tune to the secondary channel for communications. The re-tuning signal may be issued in the form of commands from base station 105, such as a downlink control information (DCI) signal, over the primary channel to the low-RF UEs to re-tune to the secondary channel or channels for communications in the current TxOP. In order to maintain access to the secondary channel, within the execution environment of re-tuning logic 704, base station 105 may perform a reserving function on the secondary channel, such as by transmitting a filler or occupancy signal or transmitting a reservation signal (e.g., RTS/CTS) on the secondary channel via wireless radios 700a-t and antennas 234a-t.

Figure 8:
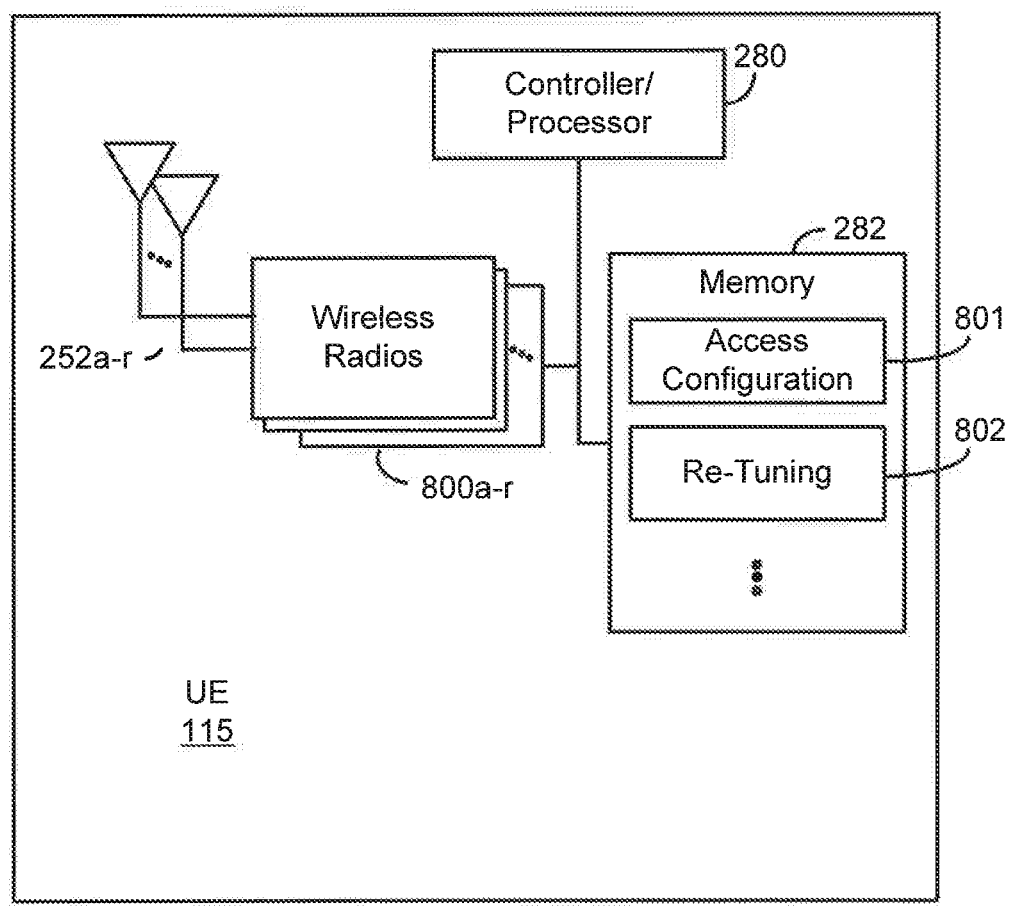
FIG. 8 is a block diagram illustrating an example UE configured according to one aspect of the present disclosure.

FIG. 5B is a block diagram illustrating example blocks executed by a low-RE-capable UE to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 505, the low-RF UE receives a configuration message from a serving base station. A low-RF UE, such as UE 115, receives the configuration message from the serving base station via antennas 252a-r and wireless radios 800a-r and stores it at access configuration 801 in memory 282. The configuration message identifies the primary and secondary LBT channels of the shared spectrum and directs the low-RF UE to monitor the primary channel for results of an LET procedure.

At block 506, the low-RF UE monitors the primary channel for a LBT indicator in response to the configuration message. With the limited RF capabilities, the low-RF-capable UEs, UE 115, monitor the primary channel using antennas 252a-r and wireless radios 800a-r for indications of a successful LBT, such as an ECCA, CCA, etc.

At block 507, the low-RF UE receives a re-tuning signal on the primary channel, wherein the re-tuning signal instructs the low-RF UE to re-tune to a secondary channel for communications during the current transmission opportunity. When the indication of successful LBT is detected via antennas 252a-r and wireless radios 800a-r, the low-RF UE, UE 115, will further receive a re-tuning signal from the serving base station via antennas 252a-r and wireless radios 800a-r. The re-tuning signal, which may be included in a DCI message, instructs UE 115 to re-tune wireless radios 800a-r to the secondary channel, as indicated in access configuration 801. UE 115 would then re-tune wireless radios 800a-r to the secondary channel for communications (e.g., uplink or downlink) during the current TxOP. These low-RF UEs, such as UE 115, will tune wireless radios 800a-r back to monitor the primary channel after the current TxOP ends.

It should be noted that the various aspects of the present disclosure are not limited to a DCI based approach for signaling the re-tuning of low-RF UEs, such as UE 115. Any delay that might be associated with DCI signaling may be reduced by providing an embedded indicator into the preamble at the beginning of the TxOP. Such an aspect would be useful where UE 115 is capable of performing hard-decoding over the preamble. The number of signaling bits can be reduced by pre-allocating the candidate secondary channel(s) to each low-RF-capable UE, such as UE 115, through prior RRC signaling. For example, a one-bit indication may be sufficient to allocate UE 115 to a pre-defined, pre-allocated secondary channel.

FIGS. 6A-6D are block diagrams illustrating multi-channel communications between a base station 105a and a low-RF UE 115f each configured according to aspects of the present disclosure. In each of FIGS. 6A-6D, base station 105a communicates with low-RF UE 115f using primary channel 60 and secondary channel 61. After configuring the shared spectrum to select the frequencies of primary channel 60 and secondary channel 61, base station 105a transmits the LBT configuration to low-RF UE 115f and instructs low-RF UE 115f to monitor primary channel 60 for identification of successful LET results. Ease station 105 performs ECCA 600 on primary channel 60 to secure access, while performing CCA 601 on secondary channel 61. When both ECCA 600 and CCA 601 are detected as successful, base station 105a will signal low-RF UE 115f to re-tune to secondary channel 61. Base station 105a may then use different mechanisms to maintain reservation of secondary channel 61.

Figure 6A:
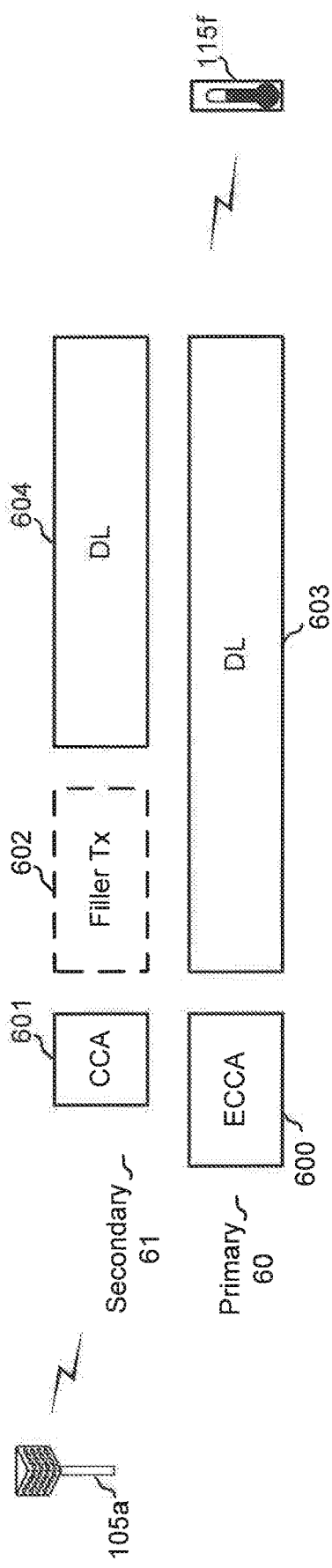
FIGS. 6A-6D are block diagrams illustrating multi-channel communications between a base station and a low-RF UE each configured according to aspects of the present disclosure.
Figure 6B:
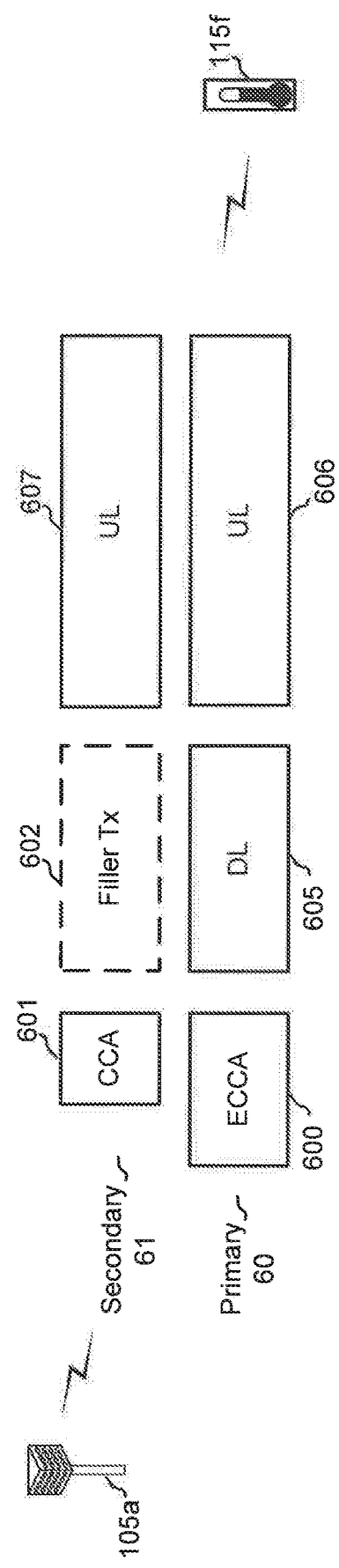

As illustrated in FIGS. 6A and 6B, base station 105a uses a filler transmission 602 to maintain occupation of secondary channel 61. After detecting successful completion of ECCA 600 and CCA 601, base station 105a signals low-RF UE 115f to re-tune to secondary channel 61, as noted above. After transmitting this signaling, which may be part of a DCI or a signal in the TxOP preamble, low-RF UE 115f begins the re-tuning processor. During that time, in order to prevent a neighboring cell from occupying secondary channel 61, base station 105a will transmit filler transmission 602 on secondary channel 61. Filler transmission 602 will occupy or reserve secondary channel 61, such that any neighboring cells that may attempt LBT during that time, will be blocked from transmissions. Thereafter, in FIG. 6A, base station 105a may transmit downlink 603 to any other non-low-RF UEs via primary channel 60, and transmit downlink 604 to low-RF UE 115f via secondary channel 61. In FIG. 6B, base station 105a may transmit downlink 605 and receive uplink 606 on primary channel 60 with a non-low-RF UE, and receive uplink 607 on secondary channel 61 from low-RF UE 115f.

Figure 6C:
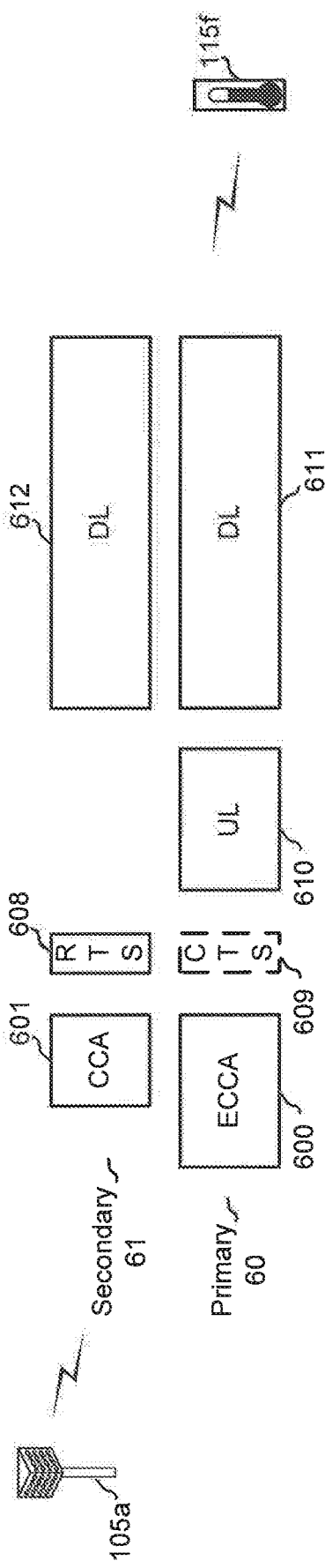
Figure 6D:
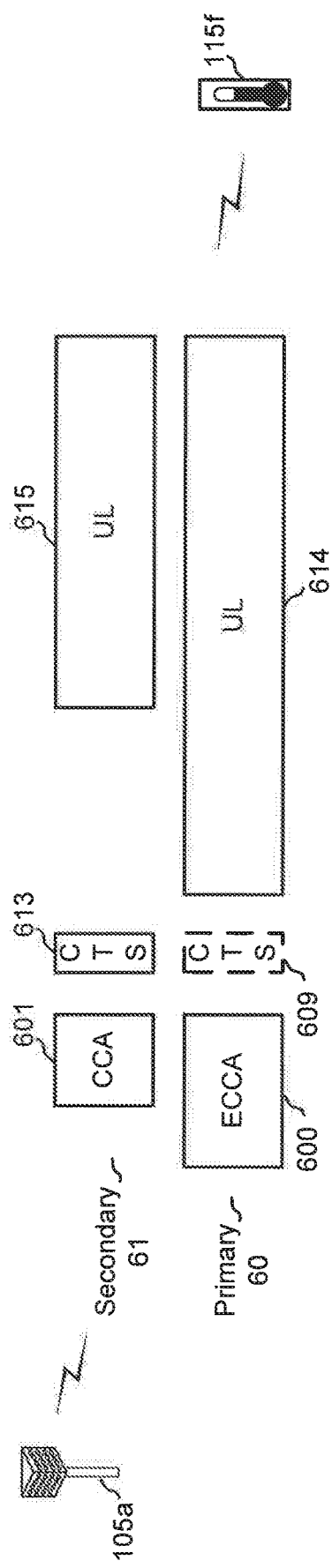

As illustrated in FIGS. 6C and 6D, base station 105a uses a channel reservation signal to maintain occupation of secondary channel 61. The channel reservation signal used by base station 105a in FIGS. 6C and 6D is a request-to-send (RTS) 608 or clear-to-send (CTS) 613. RTS/CTS signaling can effectively operate to keep neighboring nodes from attempting access to secondary channel 61. In such cases, a related CTS 609 may or may not be transmitted on primary channel 60. RTS 608/CTS 613 on secondary channel 61 are transmitted for any neighboring node listening or available for sharing the shared spectrum of secondary channel 61. Once detected by the neighboring node, the neighboring node may be configured to delay attempted access to secondary channel 61 to a next transmission availability or TxOP. Thereafter, in FIG. 6C, base station 105a may participate in uplink 610 and downlink 611 on primary channel 60 with other non-low-RF UEs and transmit downlink 612 to low-RF UE 115f via secondary channel 61. In FIG. 6D, base station 105a may receive uplink 614 on primary channel 60 from a non-low-RF UE and receive uplink 615 from low-RF UE 115f via secondary channel 61.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A and 5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    transmitting, by a network equipment, a configuration message to one or more low-radio frequency (RF) user equipments (UEs), wherein the configuration message is associated with configuring the one or more low-RF UEs to monitor a primary channel of a shared communication spectrum for a successful listen before talk (LBT) indicator, the shared communication spectrum including the primary channel and a secondary channel defined by the network equipment;
    performing, by the network equipment, an LBT procedure on the primary channel and the secondary channel; and
    signaling, by the network equipment and during a transmission opportunity, the one or more low-RF UEs on the primary channel to re-tune from the primary channel to the secondary channel for communication during the transmission opportunity based on success of the LBT procedure on both the primary and secondary channels.

2. The method of claim 1, wherein the network equipment comprises a base station and further including:
    transmitting, by network equipment during the transmission opportunity, a reservation signal on the secondary channel during a re-tuning period of the one or more low-RF UEs.

3. The method of claim 2, wherein the reservation signal includes:
    a clear-to-send (CTS) signal;
    a request-to-send (RTS) signal; or
    a channel occupancy signal.

4. The method of claim 1, wherein the signaling includes signaling on a downlink control signal to re-tune; or
    embedding a re-tuning signal into a preamble at a beginning of the transmission opportunity.

5. The method of claim 4,
    wherein the configuration message further includes a pre-allocation location of the second channel to the one or more low-RF UEs, and
    wherein the re-tuning signal signals the one or more low-RF UEs to re-tune to the second channel at the pre-allocation location.

6. The method of claim 1, further comprising:
    enabling, by the network equipment, multi-channel access based on single operator operations being unguaranteed within the shared communication spectrum; and
    defining, by the network equipment, the primary channel and the secondary channels within the shared communication channel; and prior to transmission of the configuration message, transmitting an indication of an allocation of the secondary channel as a candidate secondary channel to the one or more low-RF UEs, and wherein at least one low-RF UE of the one or more low-RF UEs has a maximum channel bandwidth capability of 20 MHz.

7. The method of claim 1, further comprising:

selecting a set of one or more candidate secondary channels, the set of candidate secondary channels including the secondary channel; and wherein performing the LBT procedure on the primary channel and the secondary channel includes:

performing an extended clear channel assessment (ECCA) on the primary channel; and performing a clear channel assessment (CCA) on each secondary channel of the set of candidate secondary channels.

8. A method of communication, comprising:

receiving, by a low-radio frequency (RF) user equipment (UE), a configuration message from a serving network equipment;

monitoring, by the low-RF UE and based on the configuration message, a primary channel for a successful listen before talk (LBT) indicator; and receiving, by the low-RF UE during a transmission opportunity, a re-tuning signal on the primary channel, wherein the re-tuning signal instructs the low-RF UE to re-tune, during the transmission opportunity, from the primary channel to a secondary channel for communications during the transmission opportunity; wherein:

the re-tuning signal is received in response to a successful listen before talk (LBT) procedure performed on the primary channel and on the secondary channel, the primary channel and the secondary channel are included within a shared communication spectrum, and the re-tuning signal is received via a downlink control signal of the re-tuning signal is embedded into a preamble received at a beginning of the transmission opportunity.

9. The method of claim 8, further including:

communicating with the serving network equipment on the secondary channel during the transmission opportunity; and tuning, by the low-RF UE, back to the primary channel after the transmission opportunity.

10. The method of claim 8, wherein the configuration message pre-allocates one or more secondary channels to the low-RF UE, and wherein the re-tuning signal identifies the secondary channel from the pre-allocated one or more secondary channels.

11. A network equipment configured for wireless communication, the network equipment comprising:

at least one processor; and a memory coupled to the at least one processor and storing processor-readable code that, when executed by the processor, is configured to:

transmit a configuration message to one or more low-radio frequency (RF) user equipments (UEs), wherein the configuration message configures the one or more low-RF UEs to monitor the primary channel for a successful listen before talk (LBT) indicator;

perform an LBT procedure on the primary channel and a secondary channel; and signal the one or more low-RF UEs on the primary channel to re-tune to the secondary channel for communication during a transmission opportunity based on success of the LBT procedures on both the primary and secondary channels.

12. The network equipment of claim 11, wherein the processor-readable code that, when executed by the at least one processor, is further configured to initiate transmission of a reservation signal on the secondary channel during a re-tuning period of the one or more low-RF UEs.

13. The network equipment of claim 12, wherein the reservation signal includes:

a clear-to-send (CTS) signal;

a request-to-send (RTS) signal; or a channel occupancy signal.

14. The network equipment of claim 11, wherein, to signal the one or more low-RF UEs on the primary channel to re-tune to the secondary channel, the processor-readable code that, when executed by the at least one processor, is further configured to:

signal on a downlink control signal to re-tune; or embed a re-tuning signal into a preamble at a beginning of the transmission opportunity.

15. The network equipment of claim 14, wherein the configuration message further includes a pre-allocation location of the secondary channel to the one or more low-RF UEs, and wherein the re-tuning signal signals the one or more low-RF UEs to re-tune to the secondary channel at the pre-allocation location.

16. A low-radio frequency (RF) user equipment (UE) configured for wireless communication, the low-RF UE comprising:

at least one processor; and a memory coupled to the at least one processor and storing processor-readable code that, when executed by the processor, is further configured to:

receive a configuration message from a serving network equipment;

monitor a primary channel for a successful listen before talk (LBT) indicator based on the configuration message; and receive, during a transmission opportunity, a re-tuning signal on the primary channel, wherein the re-tuning signal instructs the low-RF UE to re-tune, during the transmission opportunity from the primary channel to a secondary channel for communications during the transmission opportunity;

wherein the re-tuning signal is received in response to a successful listen before talk (LBT) procedure performed on the primary channel and on the secondary channel, the primary channel and the secondary channel are included within a shared communication spectrum, and the re-tuning signal is received via a downlink control signal or the re-tuning signal is embedded into a preamble received at a beginning of the transmission opportunity.

17. The low-RF UE of claim 16, wherein the processor-readable code that, when executed by the at least one processor, is further configured to tune back to the primary channel after the transmission opportunity.

18. The low-RF UE of claim 16, wherein the re-tuning signal is received via:
   a downlink control signal; or
   embedded into a preamble received at a beginning of the transmission opportunity.

19. The low-RF UE of claim 18,
   wherein the configuration message pre-allocates one or more secondary channels to the low-RF UE, and
   wherein the re-tuning signal identifies the secondary channel from the pre-allocated one or more secondary channels.

* * * * *